United States Patent [19]

Parra

[11] Patent Number: 5,168,474
[45] Date of Patent: Dec. 1, 1992

[54] ACOUSTIC MARINE AQUATIC LIFE DETECTOR WITH RESONANCE CHAMBER

[76] Inventor: Jorge M. Parra, 7332 Grand Blvd., New Port Richey, Fla. 34652

[21] Appl. No.: 793,831

[22] Filed: Nov. 19, 1991

[51] Int. Cl.[5] ............................................. G01S 15/96
[52] U.S. Cl. ..................................... 367/124; 367/119; 367/118
[58] Field of Search ................. 367/124, 119, 118, 188

[56] References Cited

U.S. PATENT DOCUMENTS 4,509,151 4/1985 Anderson ............................ 367/118

*Primary Examiner*—Daniel T. Pihulic
*Attorney, Agent, or Firm*—Jim Zegeer

[57] ABSTRACT

Aquatic animal detector apparatus is constituted by a passive transducer for converting sounds, including bio-soundwaves from a living source traveling in a body of water, to electrical signals. A resonance chamber is connected to said transducer and tuned to pass bio-sound electrical signals, and a discriminator is connected to the transducer with the discriminator being programmed to pass a predetermined pattern of bio-soundwave electrical signals constituting a sonic profile of a selected aquatic animal. The resonance tube is adjustable to adjust the resonance frequency of the resonance chamber. In a preferred embodiment, the chamber is a hollow tube with the transducer at one end of the tube and, the opposite end being open so that when immersed in said body of water, water will rise therein and adjusting the resonance frequency by adjusting the depth of immersion of said opposite end. Sound absorbing foam can be applied to the exterior surface of the tube.

4 Claims, 1 Drawing Sheet

[5,168,474]

ACOUSTIC MARINE AQUATIC LIFE DETECTOR WITH RESONANCE CHAMBER

REFERENCE TO RELATED APPLICATIONS

This application is an improvement on my application Ser. No. 07/545,954 entitled "PASSIVE ACOUSTIC AQUATIC ANIMAL FINDER APPARATUS AND METHOD" filed Jul. 2, 1990, now U.S. Pat. No. 5,099,455 which is incorporated herein by reference, and my continuation-in-part copending application Ser. No. 07/744,505 filed Aug. 14, 1991.

THE PRESENT INVENTION

In my above-referenced applications I disclose an improved low-cost passive acoustic aquatic animal detector and method which provides an indication of the presence of the aquatic animal, the direction or orientation thereof relative to the transducer, and range, as well as an indication of the type fish that is present. The operation of the passive acoustic aquatic animal detector is that the acoustic sounds are received by the passive transducer and the acoustic energy is converted to electrical energy which is then amplified and fed into a filter and phase locked loop discriminator section where the signal is bandpass filtered to remove unwanted background noise and man made interference noise and pass the desired bio-sound signals. The configuration of filters are in a cascaded high-pass/low-pass configuration to maximize attenuation outside the desired frequency. The phase locked loop is adjustable or programmed to pass a predetermined discrete pattern of electrical signals constituting a sonic profile, signature or imprint of a selected aquatic animal.

This invention is an improvement on my above-identified applications, which are incorporated herein by reference.

The objects of the invention are to provide an improved passive aquatic animal detection system which is lower in cost.

According to this invention, a passive transducer is combined with a resonance chamber having a resonance frequency corresponding to the wave length of biosound of interest. This eliminates or performs the bandpass filtering function discussed in my parent application 07/545,954, now U.S. Pat. No. 5,099,455.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
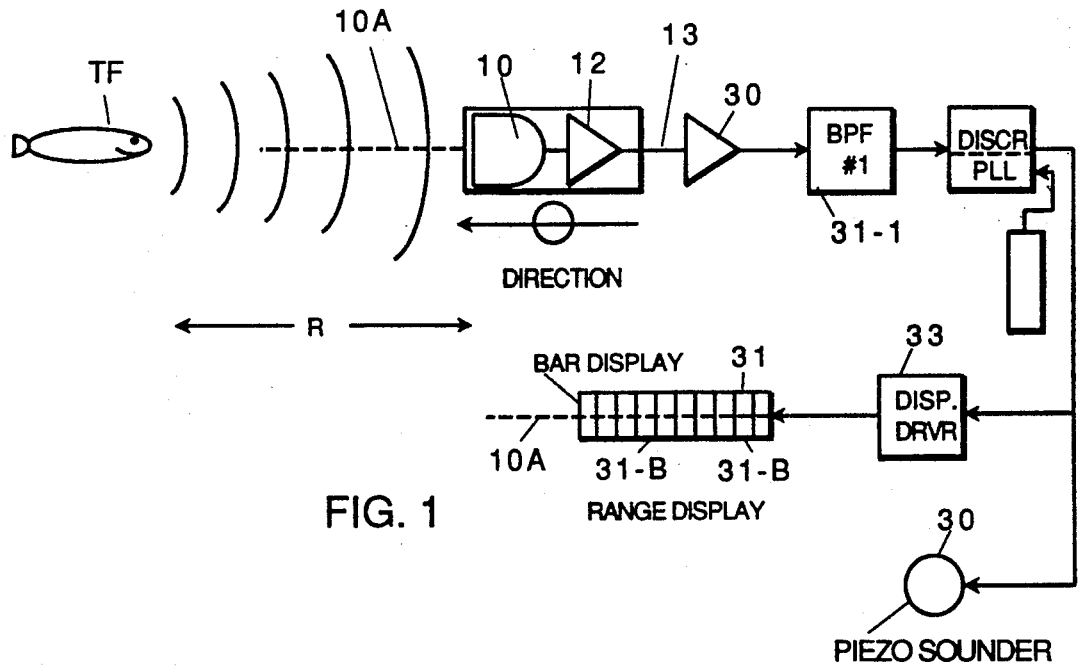
FIG. 1 is an illustration of a one-channel aquatic animal finder adapted from FIG. 2 of my application Ser. No. 07/545,954, now U.S. Pat. No. 5,099,455.
Figure 2:
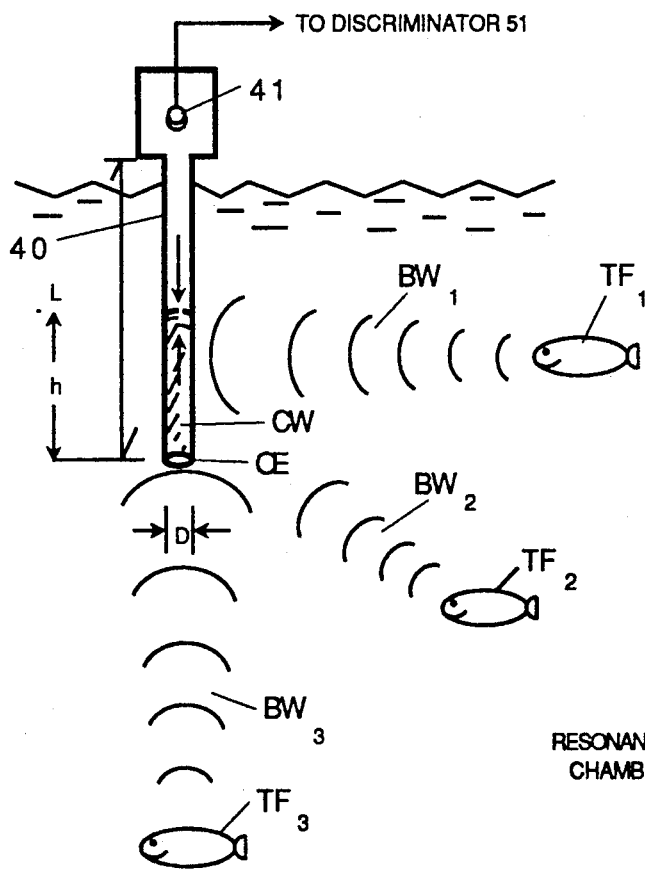
FIG. 2 is a sectional schematic view of an aquatic animal detection system incorporating the invention.

FIG. 1 is a one-channel adaptation of FIG. 2 of my above-referenced application showing a target fish TF emitting bio-soundwaves which are being received by a passive transducer 10 having axis 10a. A preamplifier 12 is coupled via a coaxial cable 13 to an amplifier 30 which, in turn, supplies the amplified signals to a bandpass filter 31 as described in my above-identified applications. Filter 31 eliminates man-made noises, etc., and passes biosound signals. Biosound signals from filter 31 are applied to discriminator 32 which has a phase-locked loop PLL which can be programmed to be selective to a particular biosound profile of a fish family or species by programming the phase-locked loop PLL programming device PD.

When discriminator 32 detects a selected species of aquatic animal, a signal is sent to display driver 33, which drives bar graph display 34, with the number of bars 34B illuminated being an indication of range to the target fish.

According to the present invention, substantially all of the function performed by the bandpass filter 31 is eliminated and the operation enhanced by a resonant chamber. Referring to FIG. 2, resonance tube 40 has a length L and a diameter D which establish the acoustic wavelength thereof, which is adjusted by the height H of the column of water CW makes via the open end OE of resonance tube 40. The tube's wavelength can be adjusted by a piston or a tuning disc carrying the transducer. The tube can be closed with an acoustic window for coupling biosounds to the response chamber and it does not have to be straight or vertical. It can be curved, or inclined, for example.

Figure 4:
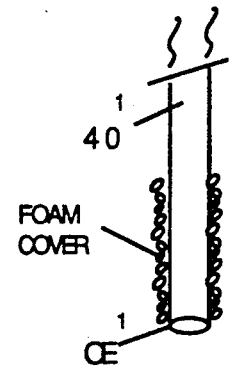
FIG. 4 illustrates a modification of the resonance tube.

A passive transducer 41 means is mounted in the resonance chamber preferably at the end opposite the open end to convert biosounds to which the tube is tuned to resonate with. Thus, relatively feeble biosound pressure waves can be selectively enhanced by virtue of the resonating structure. While it is resonating, it can store-up energy and in effect amplify the selected biosound signals—the selection being made by the effective length of the air column AC. As illustrated, biosound waves $BW_1$, $BW_2$, $BW_3$ from target fish $TF_1$, $TF_2$ and $TF_3$ are detectable since the acoustic biosoundwaves from them are received thereby. By covering the resonance tube with a foam cover 50, as shown in FIG. 4, the resonance tube can be made directionally selective.

Figure 3:
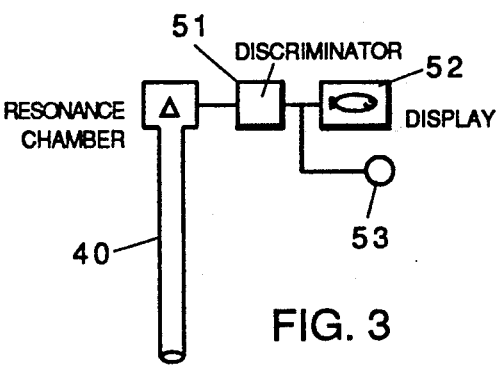
FIG. 3 is a schematic block diagram of the electrical components of the invention.

Referring to FIG. 3, the passive transducer may be connected to an amplifier and then these biosound electrical signals are discriminated in discriminator 51 which then supplies signals for driving a display 52 or a piezoelectric sounder 53.

While a preferred embodiment of the invention has been shown and described, it will be obvious that other embodiments and adaptations will be apparent to those skilled in the art.

What is claimed is:

1. Aquatic animal detector apparatus comprising:
   1) passive transducer means for converting sounds, including bio-soundwaves from a living source traveling in a body of water, to electrical signals,
   2) resonance chamber means connected to said transducer means and tuned to said bio-sound signals, and
   3) discriminator means connected to said transducer means, said discriminator being programmed to pass a predetermined pattern of bio-soundwave electrical signals constituting a sonic profile of a selected aquatic animal.

2. The aquatic animal detecting apparatus defined in claim 1 including means for adjusting the resonance frequency of said resonance chamber.

3. The aquatic animal detecting apparatus defined in claim 1 wherein said resonance chamber is a hollow tube, means mounting said transducer at one end of said hollow tube, the opposite end of said hollow tube being open so that when immersed in said body of water, water will rise therein and adjusting the resonance frequency by adjusting the depth of immersion of said opposite end.

4. The aquatic animal detecting apparatus as defined in claim 3 including sound absorbing means on the exterior surface of said hollow tube.

* * * * *